(No Model.)

J. B. GREEN.
DEVICE FOR CONNECTING FLEXIBLE TUBING.

No. 578,983. Patented Mar. 16, 1897.

Witnesses

Inventor
J. B. Green

UNITED STATES PATENT OFFICE.

JOSEPH B. GREEN, OF JANESVILLE, WISCONSIN.

DEVICE FOR CONNECTING FLEXIBLE TUBING.

SPECIFICATION forming part of Letters Patent No. 578,983, dated March 16, 1897.

Application filed November 18, 1895. Serial No. 569,363. (No model.)

*To all whom it may concern:*

Be it known that I, JOSEPH B. GREEN, of the city of Janesville, county of Rock, and State of Wisconsin, have invented certain new and useful Improvements in Devices for Connecting or Attaching Flexible Hose or Tubing Together or to a Fixed Connection, consisting of two parts or portions—a male tubular part or portion for inserting into the flexible hose or tubing, having taper annular serrations upon one or both of its ends, and a female part or portion having a taper hole suitably threaded for screwing upon the flexible hose or tubing after the male tubular part or portion is inserted in the flexible hose or tubing—of which the following is a specification.

By means of the accompanying drawings and the following description my invention will be more fully described.

Figure 1:
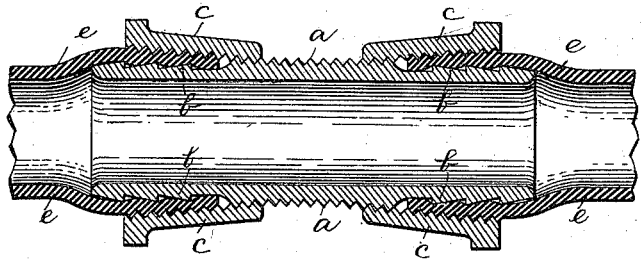
Figure 2:
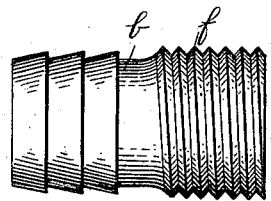
Figure 3:
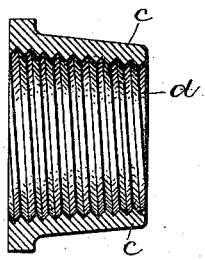

Figure 1 shows a central longitudinal view of the device in position connecting or attaching two pieces of flexible hose or tubing together. Figs. 2 and 3 show a modification of the device for attaching a nozzle to the flexible hose or tubing.

The method of connecting or attaching two pieces of flexible hose or tubing together by this device will be plainly understood from the following description and the accompanying drawings.

The male tubular part of the device $a$, Fig. 1, having the taper annular serrations $b$ and $b$ upon its ends, is inserted in the flexible hose or tubing $e$. The female part of the device $c$ is then screwed upon the flexible hose or tubing $e$ by means of the taper-thread $d$, making a perfect joint, as shown.

Figs. 2 and 3 are a modification of the male tubular part of the device, having on one end the taper annular serrations $b$ and a screw-plug $f$ at the other end, as shown, for attaching a nozzle.

I am aware that numerous devices for attaching or connecting flexible hose or tubing together are in use, but I am not aware that the device herein shown has been made or was in use prior to this application, and

What I claim as new and novel, and desire to secure by Letters Patent, is as follows:

In a hose-coupling, a tube having an externally-screw-threaded portion, and a series of annular tapering ribs at one end, the ribbed end being of less diameter than the screw-threaded portion, in combination with a nut having an internally-screw-threaded conical aperture the threads of the smaller portion of the nut engaging the threads on the sleeve, whereby the hose is clamped between the ribs on the sleeve and the threads in the nut, substantially as described.

JOSEPH B. GREEN.

Witnesses:
MALCOLM O. MOUAT,
CHARLES L. FIFIELD.